United States Patent [19]
Molders

[11] 3,913,901
[45] Oct. 21, 1975

[54] RESILIENT SUPPORTING COLUMN OF ADJUSTABLE LENGTH

[75] Inventor: Werner Molders, Mayen, Germany

[73] Assignee: Stabilus GmbH, Koblenz-Neuendorf, Germany

[22] Filed: Aug. 12, 1974

[21] Appl. No.: 496,704

[30] Foreign Application Priority Data
Aug. 16, 1973 Germany............................ 2341352

[52] U.S. Cl. .................. 267/34; 188/284; 188/300; 248/400
[51] Int. Cl.² ........................................ B60G 11/56
[58] Field of Search ........... 188/284, 300, 316, 286, 188/288; 248/399–401, 404, 354 H; 267/34, 64 R, 65 R

[56] References Cited
UNITED STATES PATENTS

| | | | |
|---|---|---|---|
| 1,261,011 | 4/1918 | Cook .................................... | 267/34 |
| 3,388,883 | 6/1968 | Axthammer et al. ............ | 248/354 H |
| 3,711,054 | 1/1973 | Bauer.................................. | 248/400 |
| 3,831,919 | 8/1974 | Nicholls................................ | 267/34 |

FOREIGN PATENTS OR APPLICATIONS

| | | | |
|---|---|---|---|
| 18,834 | 8/1914 | United Kingdom................... | 267/34 |
| 475,417 | 11/1937 | United Kingdom................ | 267/64 R |
| 993,380 | 10/1951 | France................................ | 188/284 |
| 1,238,508 | 7/1971 | United Kingdom................ | 267/65 R |

Primary Examiner—Roy D. Frazier
Assistant Examiner—Lawrence J. Staab
Attorney, Agent, or Firm—Hans Berman

[57] ABSTRACT

A resilient leg for a stool includes a cylinder normally attached to the seat of the stool and a piston rod attached to a piston in the cylinder and normally attached to the stool base. The two compartments in the cylinder axially separated by the piston are filled with compressed gas and may be connected by a manually operated valve. They are also connected automatically by recesses in the axial inner wall of the cylinder when the piston approaches one of the radial end walls of the cylinder. A helical spring then abuttingly engages the end wall and the piston rod to impede further movement of the piston toward the end wall with a force greater than that exerted by the gas in the absence of the recesses.

7 Claims, 3 Drawing Figures

RESILIENT SUPPORTING COLUMN OF ADJUSTABLE LENGTH

This invention relates to resilient supporting columns of adjustable length, and particularly to an improvement in a column of the piston-and-cylinder type whose resiliency is normally due to a body of compressible gas in the cylinder.

It is known, for example, from the Bauer U.S. Pat. No. 3,711,054, to support the seat of a stool or like device on a column including an elongated cylinder whose internal walls bound a sealed cavity. A piston axially movable in the cavity divides the cavity into two compartments. A piston rod fastened to the piston extends from the same through a transverse end wall of the cylinder outward of the cavity. The compartments may be connected by a manually operated valve in a by-pass conduit so that a compressed gas may flow freely between the compartments, thereby permitting the length of the column to be adjusted.

A column of the known type loses its resiliency when the seat is adjusted to its lowest position in which the piston rod is in its innermost axial position and prevented from further movement inward of the cylinder by abutting engagement of structural elements fixedly connected with the cylinder and the piston rod respectively.

An important object of this invention is the provision of an improved supporting column of the type described which resiliently resists shortening in all relative axial positions of the piston rod and the cylinder that may occur during normal operation of the column.

A further object is the provision of an improved column whose cost is not significantly higher than that of a corresponding column of the afore-described known type, which is simple in its construction, and which is not encumbered by additional structural elements outside the cylinder and thus of good appearance.

In one of its more specific aspects, the improved column of the invention is equipped with a second by-pass conduit which automatically responds to axial movement of the piston into a position spacedly adjacent one of the axially spaced end walls of the cylinder for connecting the two fluid-filled compartments axially offset from the piston in opposite directions. Further axial movement of the piston member from the afore-mentioned position toward the one end wall is impeded, while the second by-pass conduit is open, by a yieldably resilient device which includes a spring in the cylinder cavity. The resistance of the spring to such further axial movement is chosen to increase with decreasing spacing of the piston from the one end wall at a rate greater than the rate at which the biasing force of the body of gas in the cylinder would increase in the absence of the two afore-mentioned by-pass conduits.

Other features, additional objects, and many of the attendant advantages of this invention will readily be appreciated as the same becomes better understood from the following detailed description of preferred embodiments when considered in connection with the appended drawing in which.

Figure 1:
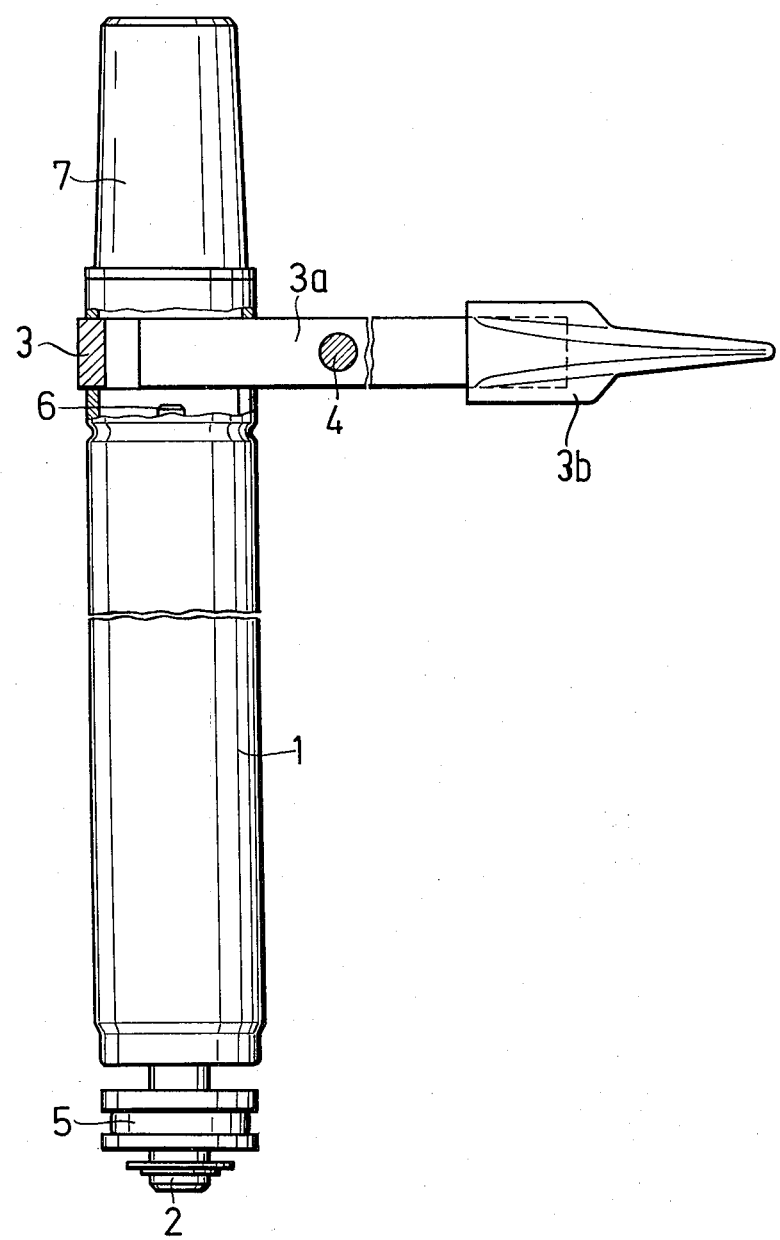
FIG. 1 shows a column of the invention in elevation, portions of the column being broken away to reveal internal structure.

Referring now to the drawing in detail, and initially to FIG. 1, there is shown a tubular shell 1 of generally circular cross section transverse to its longitudinal axis. A piston rod 2 projects axially from a lower radial end wall of the shell 1. A generally U-shaped bracket 3 is mounted in two diametrically opposite openings near the top end of the shell 1. A lever 3a is fulcrumed on a pivot pin 4 which connects the two leg portions of the bracket 3 outside the shell 1, and may be pivoted by means of a handle 3b for axially moving a valve-actuating pin 6, as will presently be described in more detail.

The end of the piston rod 2 outside the shell 1 carries the inner race 5 of a ball bearing by means of which the column may be mounted on a base for rotation about the common axis of the shell 1 and of the piston rod 2 as is known in itself. A coaxial, conical plug 7 on the top end of the shell 1 is normally inserted in a mating recess of a non-illustrated seat assembly for attaching the seat assembly to the shell 1.

Figure 2:
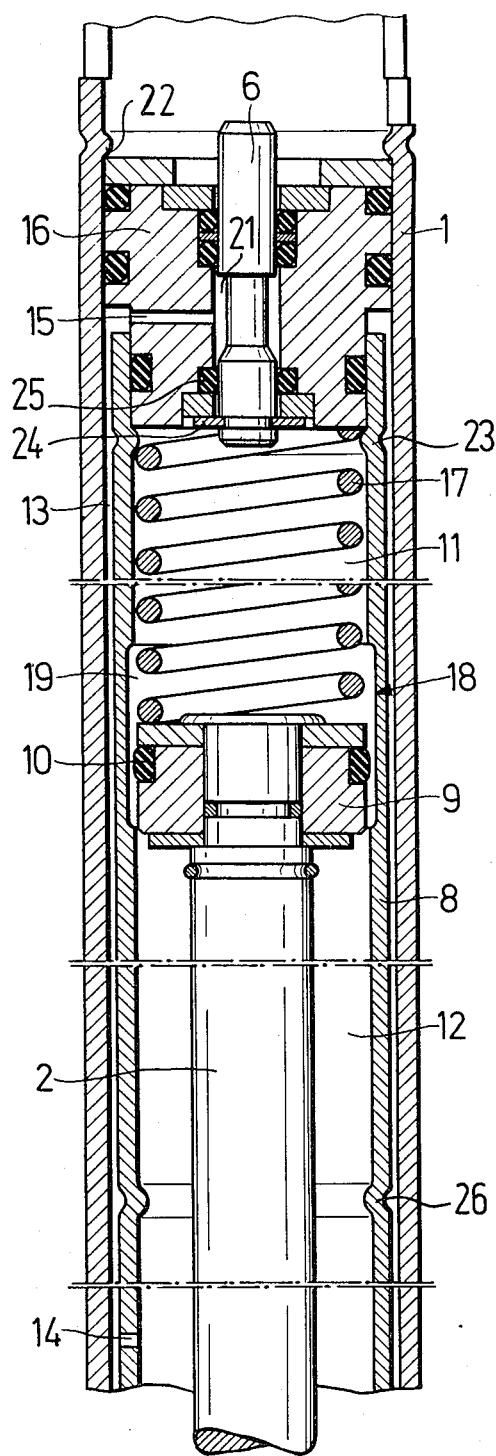
FIG. 2 illustrates a portion of the column of FIG. 1 in axial section on a larger scale.

As is shown in FIG. 2, the shell 1 spacedly envelopes a cylinder 8 whose cavity is axially divided into two compartments 11, 12 by a piston 9 fixedly mounted on the axial end of the piston rod 2 in the cylinder 8. When the piston 9 moves downward from the illustrated position, whereby the piston rod 2 moves outward of the cylinder cavity, a sealing ring 10 on the piston 9 engages the axial inner wall of the cylinder 8 to seal the compartments 11, 12 from each other.

Regardless of the axial position of the piston 9, the compartments 11, 12 may be connected by a by-pass conduit constituted by the annular space 13 between the shell 1 and the cylinder 8, by a radial bore 14 in the cylinder 8 connecting the space 13 with the compartment 12, by a radial bore 15 in a radial end wall 16 of generally stepped cylindrical shape, and by a central, axial bore 21 in the end wall 16. The end wall 16 is secured axially by integral ribs 22, 23 of the shell 1 and of the cylinder 8 respectively, and the piston rod 2 passes outward of the compartment 12 through another, non-illustrated end wall axially closing the space 13 and the compartment 12 in substantially the same manner as the end wall 16 seals the upper ends of the space 13 and of the compartment 11.

The inner end of the pin 6 carries a valve disc 24, and the afore-mentioned by-pass conduit is sealed in the condition of FIG. 2 by engagement of the disc 24 with a valve seat on the end wall 16, and further by radial engagement of the pin 6 with a sealing ring 25 on the end wall 16. When the pin 6 is moved downward by means of the manually operated lever 3a, the valve disc 24 is lifted from its seat, and a reduced portion of the pin 6 is radially aligned with the ring 25 to open the by-pass conduit. In the absence of an adequate load transmitted to the cylinder 8 by the plug 7, opening of the by-pass by the pin 6 causes compressed gas filling the compartments 11, 12 to expel the piston rod 2 from the cylinder cavity until the piston 9 abuts against an internal rib 26 on the cylinder 8.

The structure described so far is similar to that of the afore-mentioned patent and operates in an analogous known manner.

The illustrated column differs from that of the patent by the provision of a second by-pass conduit automatically connecting the compartments 11, 12 when the piston 9 moves into the illustrated position spacedly adjacent the end wall 16. The inner axial wall 18 of the cylinder 8 is provided with a shallow annular groove 19 whose generally cylindrical bottom wall is greater in diameter than the elastomeric sealing ring 10 in the relaxed condition of the latter. Regardless of the axial position of the valve-actuating pin 6, the compartments 11, 12 are connected by the by-pass between the radially aligned ring 10 and groove 19.

A helical compression spring 17 coaxial with the cylinder 8 has one axial end attached to the end wall 16 by the rib 23. Its length in the relaxed condition is chosen such that its other axial end abuttingly engages the opposite radial face of the piston 9 when the piston reaches its illustrated by-pass opening position. As the spring 17 is compressed during axial movement of the piston 9 toward the end wall 16 from the position shown in FIG. 2, its resistance to such further piston movement increases, and the characteristics of the spring 17 are chosen in such a manner that the spring resistance increases with decreasing spacing of the piston 9 from the end wall 16 at a rate greater than the rate at which the biasing force of the body of gas in the compartment 11 would increase in the absence of by-pass conduits connecting the two compartments 11, 12.

While the operation of the column has been described for the sake of convenience with reference to axial movement of the piston 9 relative to a stationary cylinder 16, it will be appreciated that the piston 9 is normally maintained in a fixed axial position by the bearing 5, and that the cylinder 8 moves downward under the weight of a person acting on the non-illustrated seat assembly, and upward under the biasing force of the compressed gas in the compartments 11, 12.

The spring 17 is preferably selected in such a manner that its several turns do not touch each other axially under normal operating conditions, such as a maximum weight of 75 kg acting on the plug 7. The spring 17 thus prevents total loss of resiliency in the column under compression in any operating condition. The force biasing the column elements toward greater column length increases steeply as the column approaches its shortest possible length, but this shortest length is not normally reached. There is never an abrupt halt in the downward movement of the normally loaded, non-illustrated seat assembly whether or not the pin 6 is in its by-pass opening position.

The transition from resiliency provided by the compressed gas (air or nitrogen) in the cylinder cavity to resilient resistance of the spring 17 during shortening of the column is smooth if the axial length of the spring in the relaxed condition is approximately equal to the axial spacing of the piston 9 from the end wall 16 when the piston enters the illustrated, by-pass opening position while moving toward the end wall 16.

Figure 3:
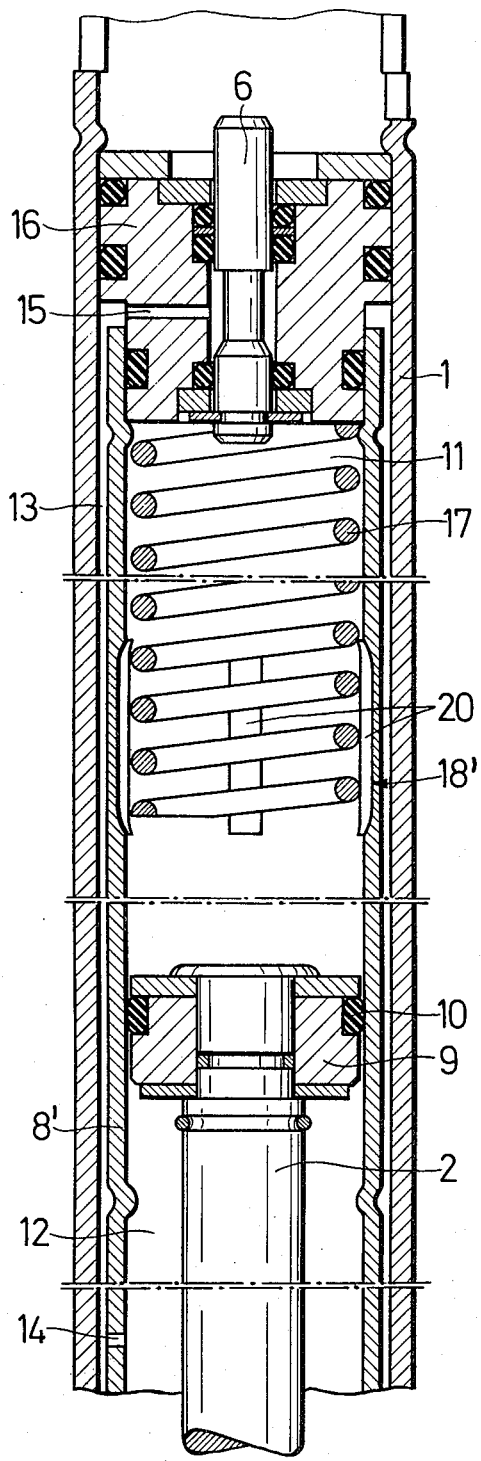
FIG. 3 is a view of a modified column corresponding to that of FIG. 2.

The groove 19 is conveniently formed in the inner wall 18 of the cylinder 8 by rolling the sheet metal cylinder between suitable shaping tools in an operation analogous to that employed in forming the ribs 22, 23, 26. However, a second by-pass conduit analogous in its function to the groove 19 may be provided in many other ways of which only one is explicitly shown in FIG. 3.

The cylinder 8', otherwise closely similar to the cylinder 8, is formed with four axially elongated grooves 20 equiangularly spaced in its inner axial wall 18'. The column of FIG. 3, identical with that shown in FIG. 2 in all other respects, is shown near its greatest length so that the sealing ring 10 sealingly engages the inner cylinder wall 18' over its entire circumference. When the piston is radially aligned with the grooves 20, the ring 10 engages only the lands between the grooves 20, and gas may flow between the compartments 11, 12 through the grooves 20.

The number, size, and shape of the grooves 20 may be chosen to suit specific, desired operating characteristics of the column. One groove 20 may be sufficient, and more than four may be provided if so desired. The grooves should be elongated in an axial direction, but they need not to be parallel to the cylinder axis. Helical grooves are effective and specifically contemplated as an example of grooves obliquely inclined relative to the cylinder axis.

A cylinder cavity completely filled with compressed gas is preferred and generally accepted in this art. However, it is known to provide a resilient gas cushion in only one of the two compartments, and to fill the remainder of the cylinder cavity with a non-compressible liquid. Such a variation has a predictably modified response to changes in an applied load, as is known in itself, and the modified column equally benefits from the essential features of this invention.

While the invention has been described with reference to a resilient column of adjustable length in which the pin 6 is mounted on the cylinder assembly 1, 8, it is equally applicable to known columns in which the valve of the first by-pass is located in the piston and is operated by means of an actuating element mounted on the piston rod, as is shown in Axthammer U.S. Pat. No. 3,388,883 and other patents antedating this invention.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A resilient supporting column of adjustable length comprising:
   a. an elongated cylinder member having a longitudinal axis, said member including an axial internal wall and axially spaced first and second end walls transverse to said axis, said axial wall and said end walls bounding a sealed cavity in said cylinder member;
   b. a piston member axially movable in said cavity toward and away from a position spacedly adjacent one of said end walls and axially dividing said cavity into two compartments,
      1. said piston member sealingly engaging said internal wall and axially sealing said compartments from each other when moving from said position thereof away from said one end wall;
   c. a piston rod fastened to said piston member and extending therefrom through said first end wall outward of said cavity;
   d. first by-pass conduit means for connecting said compartments;
   e. manually operable valve means in said conduit means for alternatively opening and sealing said conduit means;
   f. fluid filling said compartments and including a body of gas under pressure higher than atmospheric pressure and biasing said piston rod outward of said cavity when said conduit means is open;

g. second by-pass conduit means responsive to axial movement of said piston member into said position for connecting said compartments;

h. yieldably resilient means impeding further axial movement of said piston member from said position thereof toward said one end wall while said second by-pass conduit means connect said compartments,
1. said yieldably resilient means including a compression spring axially interposed between said piston member and said one end wall in one of said compartments and engaging said piston member in said position of the piston member,
2. the force of said spring opposing said further axial movement of said piston member from said position toward said one end wall increasing at a rate greater than the rate at which the biasing force of said body of gas would increase during said further axial movement in the absence of said spring and of a connection between said compartments by said first and second conduit means.

2. A column as set forth in claim 1, wherein said body of gas occupies at least a portion of each of said compartments.

3. A column as set forth in claim 2, wherein said one end wall is said second end wall.

4. A column as set forth in claim 2, wherein said axial internal wall is formed with at least one axially elongated groove, said at least one groove constituting said second bypass conduit means.

5. A column as set forth in claim 2, wherein an axial portion of said internal wall radially aligned with said piston member in said position of the latter is of a diameter sufficient radially to bound said second conduit means.

6. A column as set forth in claim 2, wherein said spring helical about said axis.

7. A column as set forth in claim 6, wherein the axial length of said helical spring in the relaxed condition is approximately equal to the axial spacing of said piston member from said one end wall when said piston member enters said position thereof while moving toward said one end wall.

* * * * *